J. E. PHILLIPS.
CALENDAR ACCOUNTING MEANS.
APPLICATION FILED AUG. 22, 1919.

1,341,018.

Patented May 25, 1920.
2 SHEETS—SHEET 1.

Fig. 1

Inventor
JAMES E. PHILLIPS.
By Louis P. Griswold
Atty.

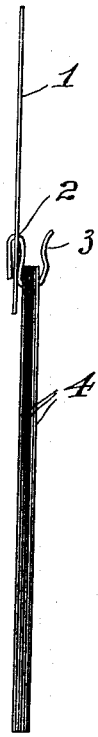

UNITED STATES PATENT OFFICE.

JAMES E. PHILLIPS, OF CHICAGO, ILLINOIS.

CALENDAR ACCOUNTING MEANS.

1,341,018. Specification of Letters Patent. Patented May 25, 1920.

Application filed August 22, 1919. Serial No. 319,159.

*To all whom it may concern:*

Be it known that I, JAMES E. PHILLIPS, a citizen of the United States, residing at Chicago, in the county of Cook and State of Illinois, have invented certain new and useful Improvements in Calendar Accounting Means, of which the following is a specification.

This invention relates to means of keeping accounts in connection with a loose leaf calendar and it is designed especially for facilitating the keeping of farm or household accounts.

The principal object of the invention is to provide a calendar, on the monthly loose leaves of which daily business transactions may be conveniently recorded, and the itemized monthly debits and credits summarized.

A further object of the invention is the provision of a calendar embodying a support or hanger member to which the monthly date sheets, thus designed, are loosely connected, and having printed on the back thereof a form adapted to the tabulation of the itemized yearly summary of the monthly transactions.

With these and other apparent objects in view, the invention consists of a calendar embodying the features to be more fully set forth hereinafter, the scope of the invention being pointed out in the appended claims.

In the accompanying drawings, which are made part of the specification, similar reference characters are employed to designate corresponding elements.

In the said drawings Figure 1 is a face view of a calendar embodying the improved system.

Fig. 2 is an edge view with a portion of the top member or support broken away, and Fig. 3 is a rear view of the top member.

In carrying out my present invention I prefer to use a calendar-construction, as illustrated, for which a patent has been granted to me, said patent being No. 1,288,167, and bearing date December 17th, 1918. While this construction is most conveniently adaptable to the improved features, it will be understood that I am not confined to this specific form of assemblage of parts.

The calendar provides a hanger or supporting member 1 having apertures 2 therein. The apertures 2 are adapted to receive and retain hooks 3 on which the monthly date sheets 4 are hung, apertures 5 being provided in the date sheets for this purpose.

There are numerous advantageous features in a calendar of this general construction, which are set forth in my former patent, and it will be apparent that the construction above briefly described provides a desirable accommodation for the improved account system.

The date sheets 4 are each provided with spaces 6 in which may be recorded daily financial transactions. Said sheets are also provided with a form for carrying forward, or tabulating an itemized summary of such transactions, said form including a vertical column 7 for recording disbursements, a like column 8 for recording receipts, and an interposed column 9 in which is arranged a series of headings indicating the general classification of disbursements and receipts, and under each heading a plurality of items.

Referring to the date sheet illustrated in Fig. 1, it will be noted that daily disbursements and receipts are recorded in the divisional spaces 6. As shown, on Wed. the 1st. $35.00 was paid in wages; on Thu. the 2nd. $28.00 worth of milk and .55 worth of eggs were sold. On the 4th. a plow was bought for $22.00, the letter "B" being used as a symbol. On the 14th. the same symbol is used in connection with the data to denote that 10 bu. of seed corn was bought for $60.00. On the 24th. hogs were sold for $400.00, as shown, and so on, entries being made of the financial transactions each day in the space provided therefor.

At the close of each month a summary of the transactions is recorded in the form on the right of the sheet, as shown. This particular date sheet shows that during the month of January, 1919, $400.00 was received for hogs; $90.00 was paid for hogs; $210.00 was received for wheat; $60.00 was paid out for corn, and so on, the disbursements totaling $367.00, and the receipts totaling $3111.64.

The monthly date sheets are filed in some convenient, safe place for future reference, and for use in preparing the yearly summary, which is another element of the system, provision being made therefor on the back of the calendar member 1, as shown in Fig. 3.

The form on the back of member 1 provides a vertical column 10 in which is arranged a plurality of items corresponding to the items on the monthly date sheets. The space to the left of the column 10 is designed for recording a yearly summary of disbursements, and the space to the right of said item column is for a yearly summary of receipts. With this end in view, thirteen vertical columns are arranged on the disbursement side, the column 11 being a total column while the remaining twelve columns are for monthly records. A similar arrangement is provided on the receipt side, the column 12 being a total column while the other columns are for monthly receipts.

The disbursement space and the receipt space are both ruled horizontally, thereby forming divisions of the vertical monthly and total columns, corresponding to, or projecting from the items in the column 10, and a general total spacing is provided at the foot of all the columns.

At the close of each month the monthly totals of disbursements and receipts are carried over from the monthly date sheets to the yearly summary form provided on the back of member 1. For example, the amounts set down in column 7 of sheet 4, Fig. 1, are entered in the Jan. disbursement column of the yearly summary form, as shown in Fig. 3, and the amounts recorded in column 8 are transferred to the Jan. receipt column of said form. At the close of the year the total disbursements for each item are entered in the column 11, and the total receipts from each item are placed in column 12, and a grand total of disbursements and receipts set down at the foot of the respective vertical total columns. The accuracy of the operation can readily be proven, as the sum of the correct monthly disbursement totals must equal the grand total at the foot of column 11, and the sum of the correct monthly receipt totals must equal the grand total at the foot of column 12. The simple problem of deducting the total amount at the foot of column 11 from that at the foot of column 12, gives the net income for the year.

The forms for this account system, when embodied with a calendar greatly enhance its efficiency as an article of utility in the household. It also adds to the value of the calendar as an advertising medium, which is a common use for calendars, as it is appreciated by the farmer, or householder, providing a simple and convenient means for keeping a ready reference account of daily, monthly, and yearly financial business transactions. Moreover, it is a lasting advertisement for the merchant who employes it for this purpose. The several parts of the calendar are treasured and preserved, as the date sheets carry the record of daily and monthly transactions, and coöperate with the top member for the summarization of the yearly business.

What I claim and desire to secure by Letters Patent is—

1. A calendar accounting means, comprising a calendar having a plurality of detachable printed date sheets, said sheets each provided with delineated record spaces corresponding to the days of a month, wherein data of transactions for each day may be entered, and each sheet provided with appropriately designated columns for the entry of a monthly summary of the daily transactions.

2. A calendar accounting means, comprising a calendar having a supporting member and a plurality of detachable printed date sheets, said sheets each provided with delineated record spaces corresponding to the days of a month, wherein data of transactions for each day may be entered, and each sheet provided with appropriately designated columns for the entry of a monthly summary of the daily transactions, and a yearly summary form on the supporting member.

3. A calendar accounting means, comprising a calendar having a supporting member, a plurality of printed monthly date sheets, and means for detachably connecting said date sheets with the supporting member, each monthly date sheet provided with delineated record divisional spaces corresponding to the days of a month, wherein data of financial disbursements and receipts for each day may be entered, each of said sheets having a list of items arranged thereon and appropriately designated blank columns arranged in co-relation to said list, wherein entry may be made of a monthly summary of the daily disbursements and receipts.

4. A calendar accounting means comprising a calendar having a supporting member, a plurality of printed monthly date sheets, and means for detachably connecting said date sheets with the supporting member, each monthly date sheet provided with delineated record divisional spaces corresponding to the days of a month, wherein data of financial disbursements and receipts for each day may be entered, each of said sheets having a list of items arranged thereon and appropriately designated blank columns arranged in correlation to said list, wherein entry may be made of a monthly summary of the daily disbursements and receipts, and the supporting member of the calendar having a list of items arranged thereon and blank forms arranged in correlation to said list, wherein can be tabulated a yearly summary of the disbursements and receipts as recorded on the monthly date sheets.

In testimony whereof I affix my signature.

JAMES E. PHILLIPS.